(12) United States Patent
Enric

(10) Patent No.: US 6,920,375 B2
(45) Date of Patent: Jul. 19, 2005

(54) OPTICAL ARM FOR GUIDING A LASER BEAM ON A ROBOT ARM

(75) Inventor: Vila Papell Enric, Barcelona (ES)

(73) Assignee: I.G.A. Landaben S.L., Pamplona (ES)

( * ) Notice: Subject to any disclaimer, the term of this patent is extended or adjusted under 35 U.S.C. 154(b) by 160 days.

(21) Appl. No.: 10/467,605

(22) PCT Filed: Feb. 5, 2002

(86) PCT No.: PCT/IB02/01263

§ 371 (c)(1),
(2), (4) Date: Aug. 5, 2003

(87) PCT Pub. No.: WO02/062536

PCT Pub. Date: Aug. 15, 2002

(65) Prior Publication Data

US 2004/0078115 A1 Apr. 22, 2004

(30) Foreign Application Priority Data

Feb. 6, 2001 (ES) .......................... P 200100256

(51) Int. Cl.⁷ .......................... G05B 19/00; G05B 21/00
(52) U.S. Cl. .................. 700/258; 700/245; 700/258; 700/259; 700/250; 700/254; 219/121.6; 219/121.63; 219/121.64; 219/121.78; 219/121.79; 606/10; 356/500; 318/568.1; 901/1
(58) Field of Search .................. 700/258–259, 700/245, 250, 254; 219/121.6, 121.63, 121.64, 121.78, 121.79; 606/10; 356/500; 250/202; 318/568.1; 901/1

(56) References Cited

U.S. PATENT DOCUMENTS

| | | | |
|---|---|---|---|
| 4,545,713 A | | 10/1985 | Beni et al. |
| 4,626,999 A | | 12/1986 | Bannister |
| 4,892,992 A | * | 1/1990 | Akeel et al. ............ 219/121.78 |
| 5,130,523 A | * | 7/1992 | Raleigh et al. ............. 250/202 |
| 5,198,874 A | * | 3/1993 | Bell et al. .................... 356/500 |
| 5,304,773 A | * | 4/1994 | Kilian et al. ........... 219/121.78 |
| 5,371,337 A | * | 12/1994 | Campbell et al. ...... 219/121.63 |
| 5,408,065 A | * | 4/1995 | Campbell et al. ......... 219/121.6 |
| 5,954,711 A | * | 9/1999 | Ozaki et al. ................. 606/10 |
| 2002/0107510 A1 | * | 8/2002 | Andrews et al. ............. 606/10 |
| 2003/0127434 A1 | * | 7/2003 | Ruben .................... 219/121.64 |

OTHER PUBLICATIONS

Ha et al., Estimation of the position and orientation of a planar surface using multiple beams, 1993, IEEE, pp. 628–629.*
Leigh–Lancaster et al., Development of a laser tracking system, 1997, IEEE, pp. 163–168.*
Yuta et al., Implementaion of an active optical range sensor using laser sslit for in–door intelligetn mobile robot, 1991, IEEE, pp. 415–420.*
Kim et al., Pose detection of moving vehicle using rotating LSB (Laser Slit Beam), 2001, IEEE, pp. 83–88.*

* cited by examiner

*Primary Examiner*—Thomas G. Black
*Assistant Examiner*—McDieunel Marc
(74) *Attorney, Agent, or Firm*—Sills Cummis Epstein & Gross; Barry J. Marenberg

(57) ABSTRACT

This optical arm applicable to robots is comprised of: some bent tubular parts (1, 6, 16, 18), a straight tubular length (21) and an outlet part (23), coupled together with the possibility of rotation; also including some means (7) to secure the optical arm to a robot (5). The bent tubular part (1) is mounted with the possibility of rotation on the outlet (2) of a laser generator (3) secured to the third arm (4) of the robot (5). Parts (1, 6, 16 and 18) have a window (28), in each bend, equipped with some inner lugs (28) which a mirror (29) is pressed on to by means of some springs (33) foreseen with a removable part (32).

7 Claims, 7 Drawing Sheets

OPTICAL ARM FOR GUIDING A LASER BEAM ON A ROBOT ARM

OBJECT OF THE INVENTION

This invention refers to an optical arm designed to be coupled to a robot and to adapt to the robot's movements ensuring the guidance of a beam of light from a laser generator to an outlet part.

BACKGROUND OF THE INVENTION

Currently the use of laser in different applications is normal practice, as well as the use of robots to guide the beam of light in the desired direction.

The use of a laser combined with a robot poses some important problems concerning the guiding of the beam of light from the laser generator to a outlet part or applicator, as the optical arm used to guide it must be able to accompany the robot in its movements.

To achieve this, some of the currently used optical arms are comprised of a series of tubular lengths which are placed parallel to each of the robot arms and which are joined together by means of some articulations, whose rotation axes coincide with each one of the rotation axes of the robot, these articulations including a mirror responsible for making a change in direction of the beam of light, which passes through the inside of the optical arm in each one of these articulations.

These optical arms, apart from been excessively complicated, limit the robot movements to a large extent.

In other cases the laser generator is placed in an area close to the robot, using an optical arm with long stretches and the necessary articulations so that the end part of the optical arm, mounted on the sixth arm of the robot, is able to following the movements of the latter. In this case the optical arm hangs from some supports that considerably stand out from the robot, limiting its movements as well as its area of action to a great extent.

DESCRIPTION OF THE INVENTION

To solve the problems mentioned, an optical arm applicable to robots targeted by this invention has been designed and which has some constructive peculiarities aimed at permitting its assembly on any traditional robot, occupying minimum space and practically without limiting the mobility of the robot.

According to this invention, this optical arm is comprised of:

a first bent tubular part mounted with the possibility of rotation on the outlet from the laser generator secured to the third arm of the robot, a second bent tubular part mounted with the possibility of rotation on some support means secured to the fourth arm of the robot, some guides that fasten the two bent tubular parts mentioned above, permitting their relative movement and ensuring the permanence of the respective outlets and inlets in opposing positions during the rotation of the fourth arm of the robot, an extending tubular element that joins the outlets and the inlets of the aforementioned tubular parts delimiting the passage area of the beam;

a third bent tubular part, which is secured to the second bent part, its inlet being placed opposite the outlet of this second bent part and its outlet placed coaxially with the fifth rotation axis of the robot;

a tubular part with three consecutive bends, the inlet being mounted coaxially, with possibility of rotation, on the outlet of the third bent part and with its outlet placed parallel to the sixth rotation axis of the robot;

some means to fasten the part equipped with three consecutive bends to the fifth arm of the robot, permitting its rotation around the outlet of the their bent part, a straight tubular length mounted coaxially on the outlet of the part with three consecutive bends, a support for fastening the tubular length, respect to the fifth arm of the robot, without possibility of rotation, an outlet part mounted coaxially, with possibility of rotation, on the tubular length and some means to transmit the rotation movement of the sixth arm of the robot to the outlet part.

In accordance with the invention the outlets of the bent parts will form 90° angles, and these parts have a window in each one of their bends with inner lugs, which defines an inclining plane to support a mirror responsible for causing a change in direction of 90° in the beam of light that falls upon it.

During the construction of the robot the outer surfaces of the lugs mentioned can be reduced as necessary to guarantee that the plane defined by them forms a 45° angle with the beam of light that falls upon the mirror mounted upon them, ensuring that the change in direction of the beam caused by the mirror mentioned is 90°.

In accordance with the invention, the parts foreseen with bends have means on the outside to fasten a part provided with some springs that press the mirror against the support lugs defined in the relative window. The fastening of the mirror respect to these parts by means of the pressure of the springs guarantees the immobilisation of the mirror during the use of the optical arm and facilitates its replacement in the case of deterioration, as to carry out this replacement, it will suffice to support the new mirror on the support lugs and again mount the spring-bearing part, without having to mate any adjustment in the mirror.

The support means of the optical arm with respect to the spring include a piece of elastic material responsible for absorbing any possible disalignments of the arm respect to the robot during its movements.

The guides mentioned above and responsible for connecting the two bent tubular parts are joined to one of these parts and are mounted with the possibility of longitudinal movement respect to the other, so that during the rotation of the fourth axis of the robot the outlets and inlets of these parts will be kept perfectly aligned.

The means responsible for transmitting the rotation movement of the sixth arm of the robot to the outlet part are comprised of pinions of the same diameter, geared together and secured coaxially to the sixth arm of the robot and to the outlet part, respectively.

DESCRIPTION OF THE FIGURES

To complement the description that is being carried out and in order to facilitate the understanding of the characteristics of the invention, a set of drawings are enclosed with this descriptive report where, with an illustrative but limiting nature, the following has been illustrated.

PREFERENTIAL EXECUTION OF THE INVENTION

Figure 1:
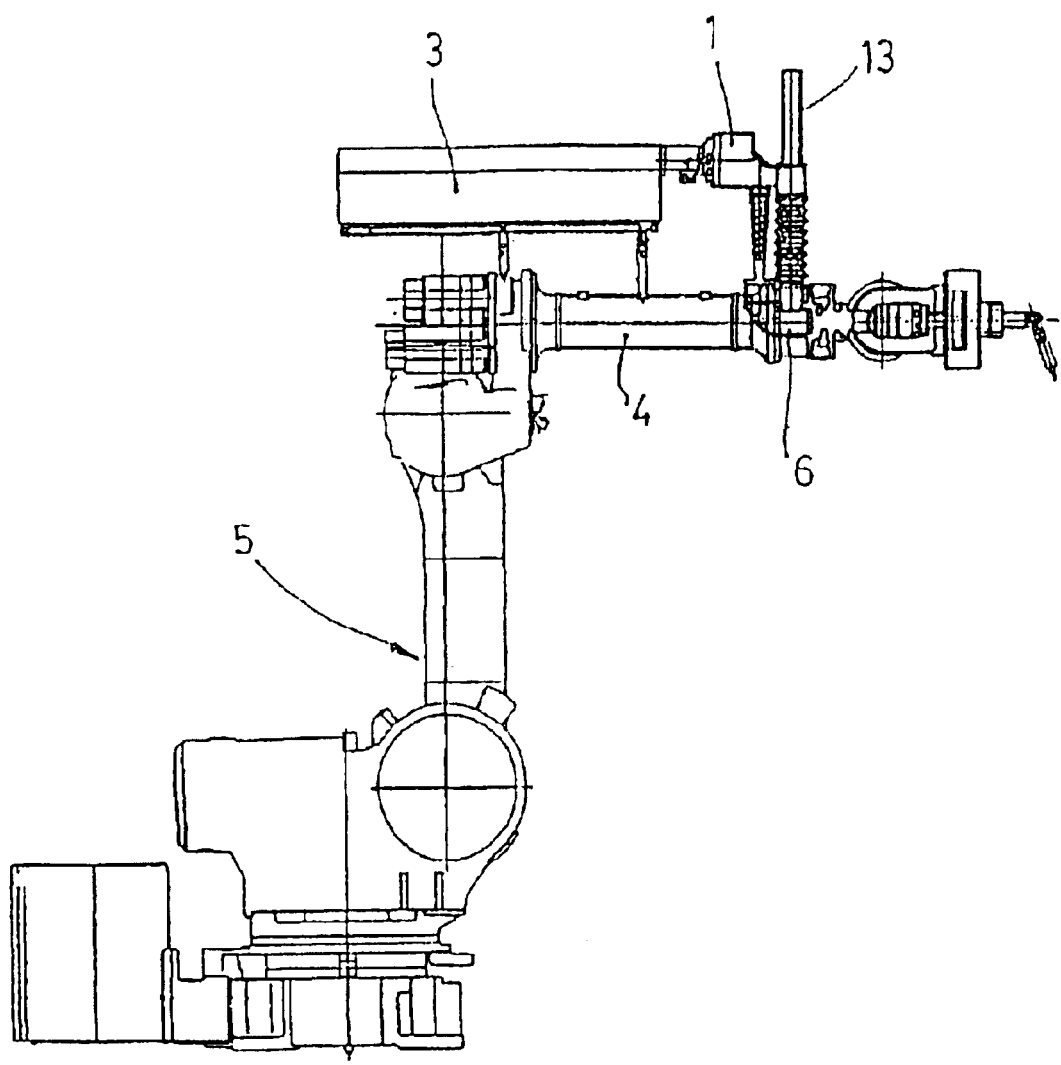
FIG. 1 shows a general profile view of the optical arm targeted by the invention mounted on a traditional six-axis robot.
Figure 2:
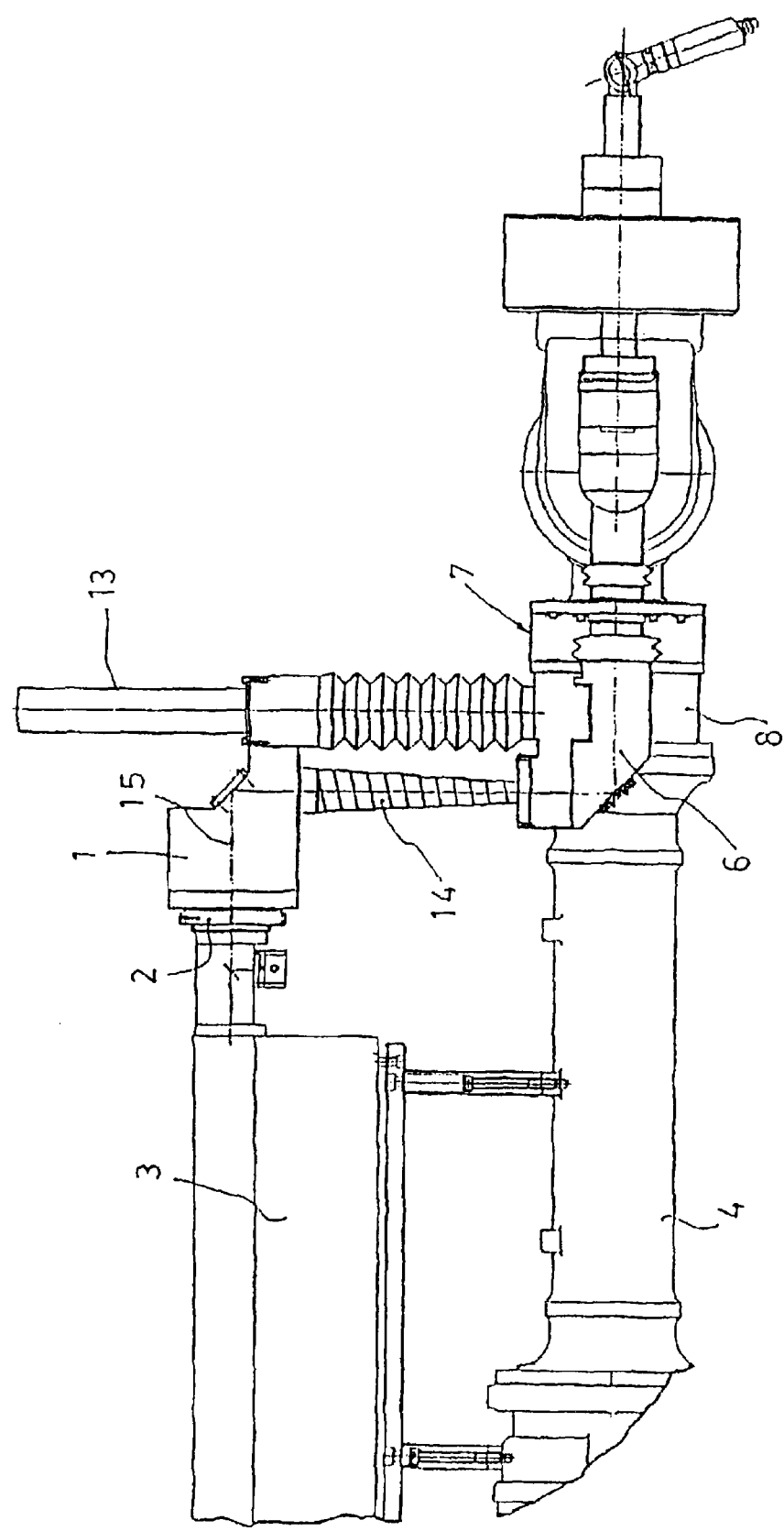
FIG. 2 corresponds to an enlargement of one portion of the previous figure where the optical arm can be seen on a larger scale and where only one part of the robot has been illustrated.
Figure 3:
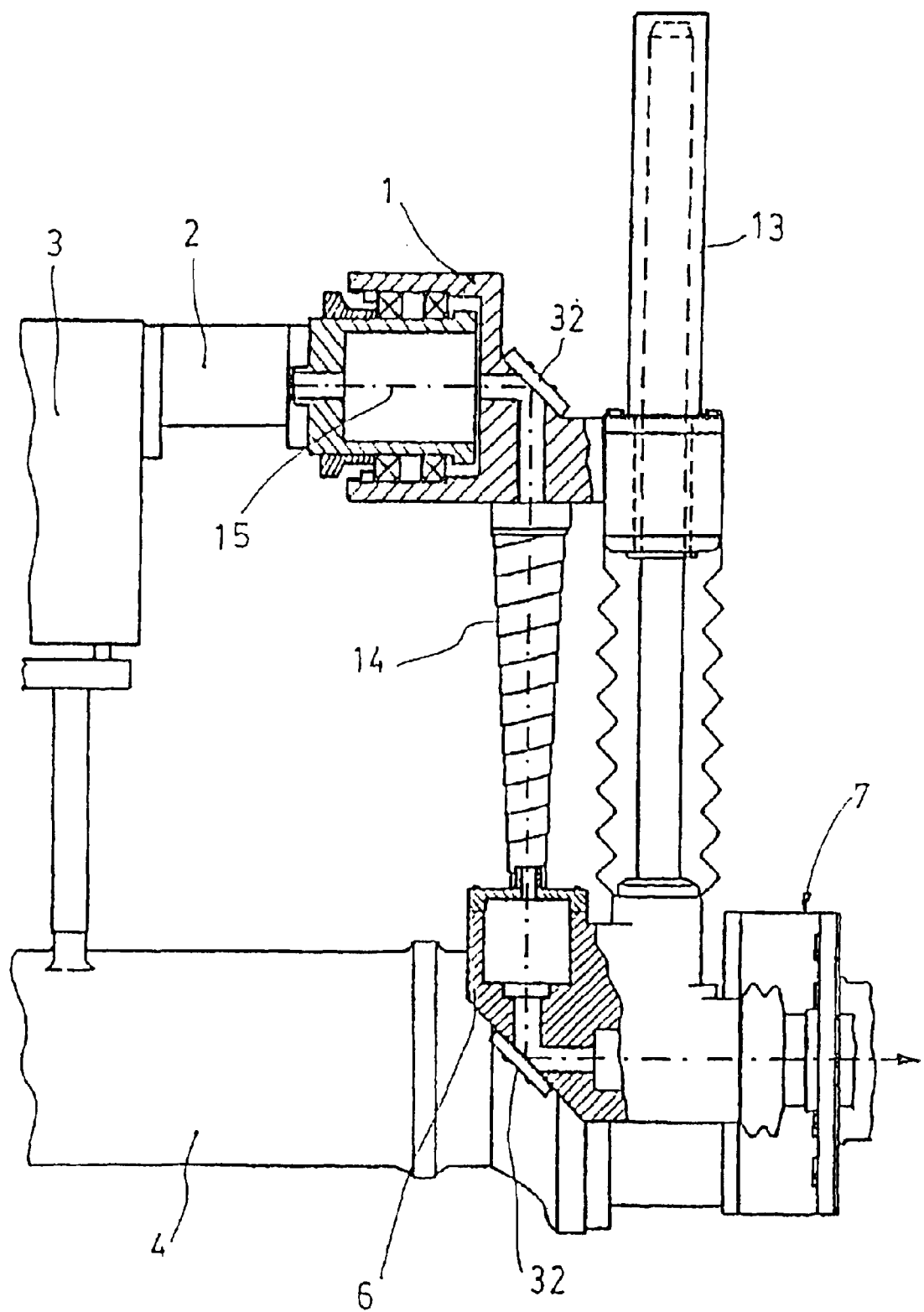
FIG. 3 shows a schematic section of an initial length of the optical arm partially sectioned.
Figure 4:
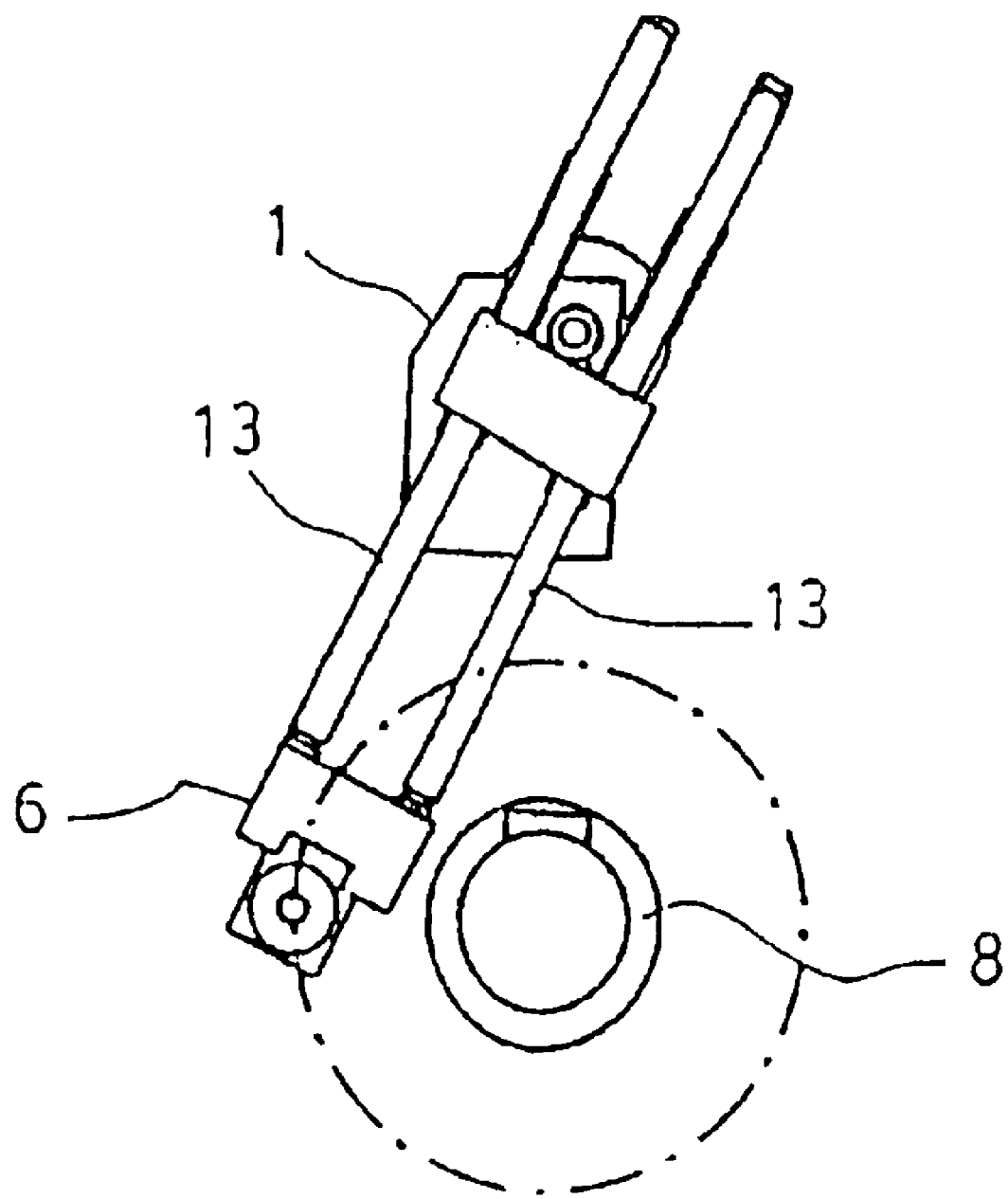
FIG. 4 corresponds to a front view of the previous figure where the guides that join the first and second bent tubular parts can be seen.

As can be seen in the figures referred to, the optical arm targeted by this invention has a first bent tubular part (1) mounted with some bearings, and therefore with the possibility of rotation, on the outlet (2) of a laser generator (3) which is fastened to the third arm (4) of a robot referenced in the assembly as (5). The optical arm has a second bent tubular part (6) which is mounted with some bearings and therefore with the possibility of rotation on some support means (7) fastened to the fourth arm (8) of the robot (5)

Figure 8:
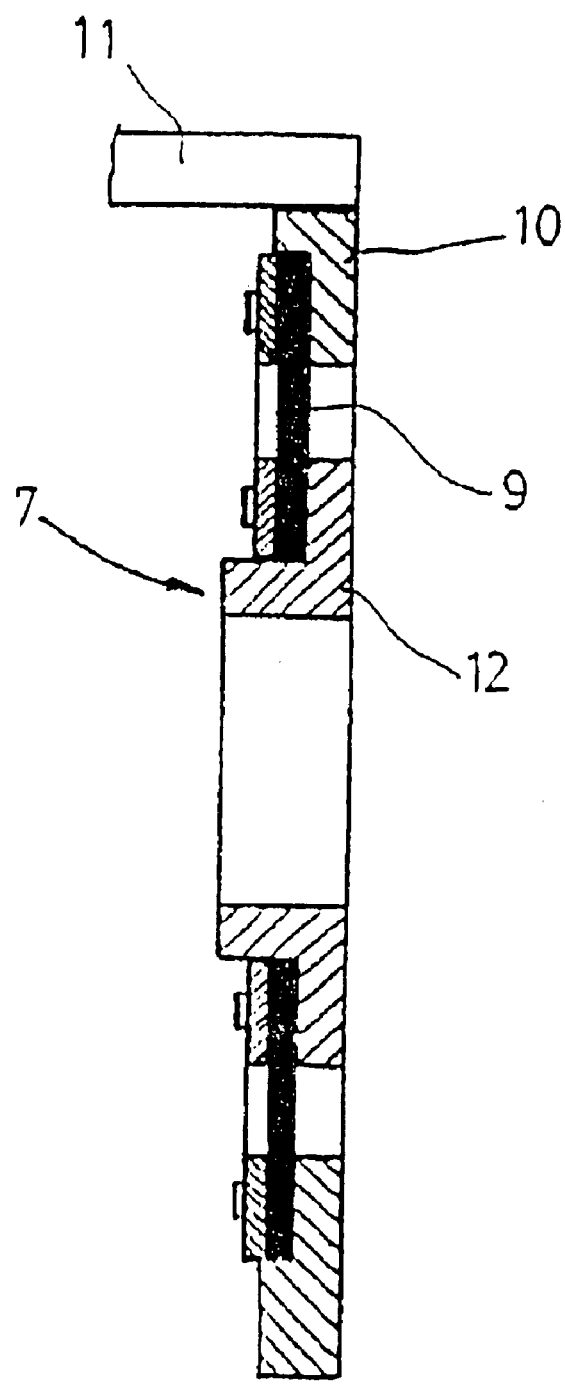
FIG. 8 shows an execution example of the support means used to secure the optical arm of the robot, these means being illustrated sectioned.

As can be seen in FIG. 8, the support means referred to in the assembly as (7) include an annular piece (9) of elastic material whose outer area is secured by means of a flange (10) to an arm (11) joined to the fourth arm of the robot and whose inner area is secured with the relative flange (12) to the optical arm.

Therefore, the fastening of the optical arm to the robot is established through the elastic annular piece (9), the deformation of the latter permitting the absorption of any possible disalignments of the optical arm with respect to the robot when it moves.

Parts (1 and 6) are joined by some parallel guides (13) which are joined to part (6) and which are mounted on part (1) with the possibility of longitudinal movement, these parts ensuring the alignment of the outlet of part (1) and of the inlet of part (6) during the rotation of the fourth arm (8) of the robot.

An extending tubular element (14) is mounted on the outlet of part (1) and on the inlet of part (6), which delimits the passage area of the beam of light (15) coming from the generator (3).

The optical arm has a third bent tubular piece (16) whose inlet is secured coaxially to the outlet of the part (6), in turn placing the outlet of the bent part (16) coaxially with the fifth rotation axis (17) of the robot (5).

A tubular part (18), which has three consecutive bends, is mounted coaxially on the outlet of part (16) by means of bearings, and therefore with the possibility of rotation. The outlet of the tubular part (18) is placed parallel to the sixth rotation axis (19) of the robot.

The tubular part (18) is secured to the fifth arm (20) of the robot (5) by some support means (7) similar to those described above and illustrated in FIG. 8.

A tubular length (21), secured by means of a rigid support (22) to the fifth arm (20) of the robot, is mounted coaxially on the outlet of the tubular part (1), without the possibility of rotation.

The outlet part (23) of the optical arm is mounted coaxially on the tubular length (21) and with the possibility of rotation.

Figure 5:
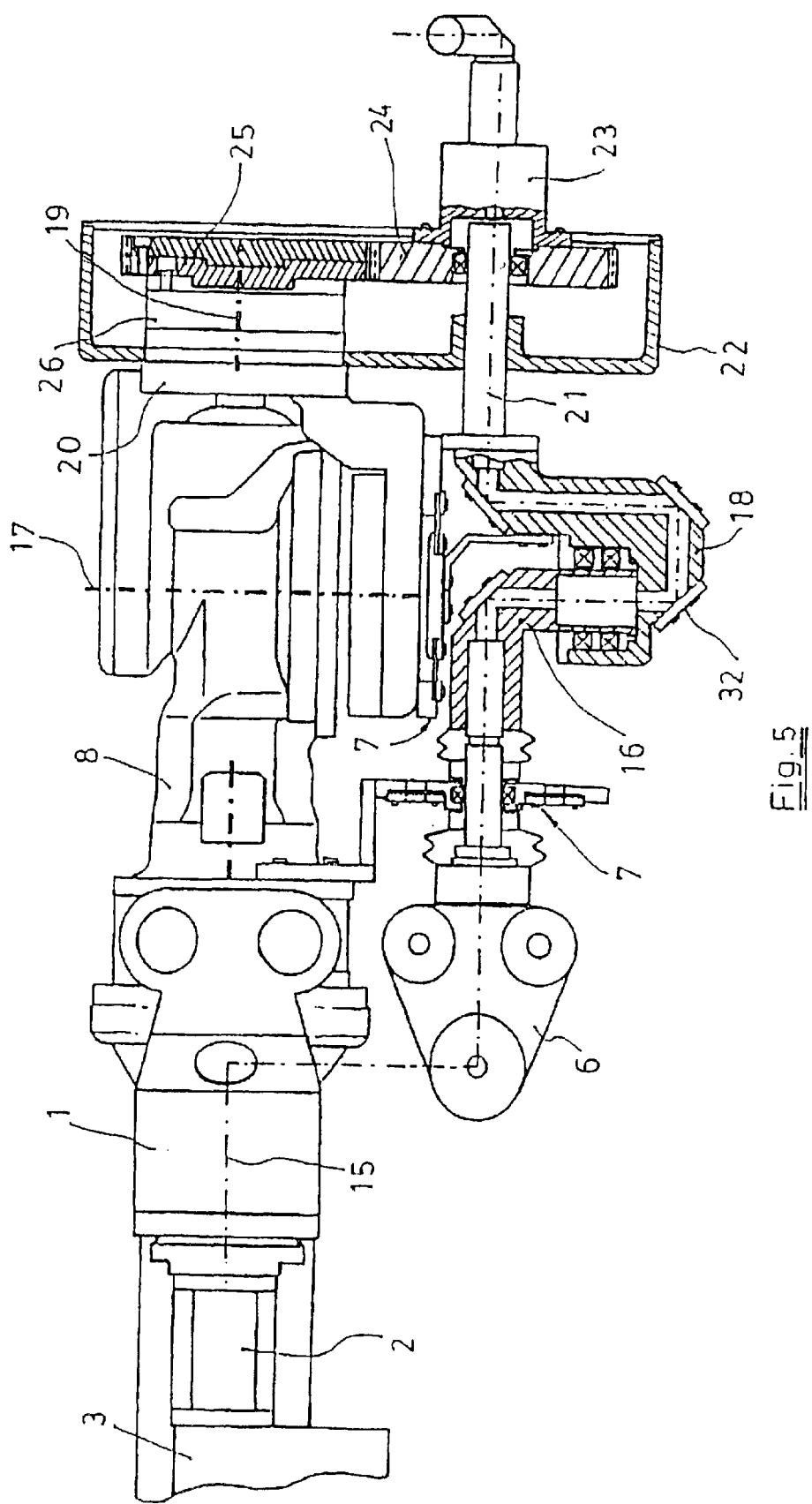
FIG. 5 shows an upper ground plan view of the optical arm partially sectioned and where the means used to transmit the rotation of the sixth arm of the robot to the outlet part of the optical arm can be seen. In this figure the guides that join the first two bent parts have been eliminated.

As can be seen in FIG. 5, this outlet part (23) is joined to a pinion (24), which is geared with two pinions (25) of the same diameter as the latter and joined to the sixth arm (26) of the robot. The pinions (25) can be outphased angularly to achieve a fine adjustment of the teeth with respect to the teeth of the pinion (24) and to avoid play in the transmission of the rotation movement of the sixth arm (26) of the robot to the outlet part (23).

The aim of the bent parts (1, 6, 16 and 18) is to provoke the changes in direction of the laser beam (15) coming from the generator (3) so that this is correctly guided through the inside of the optical arm until it reaches the outside through the outlet part (23)

Figure 6:
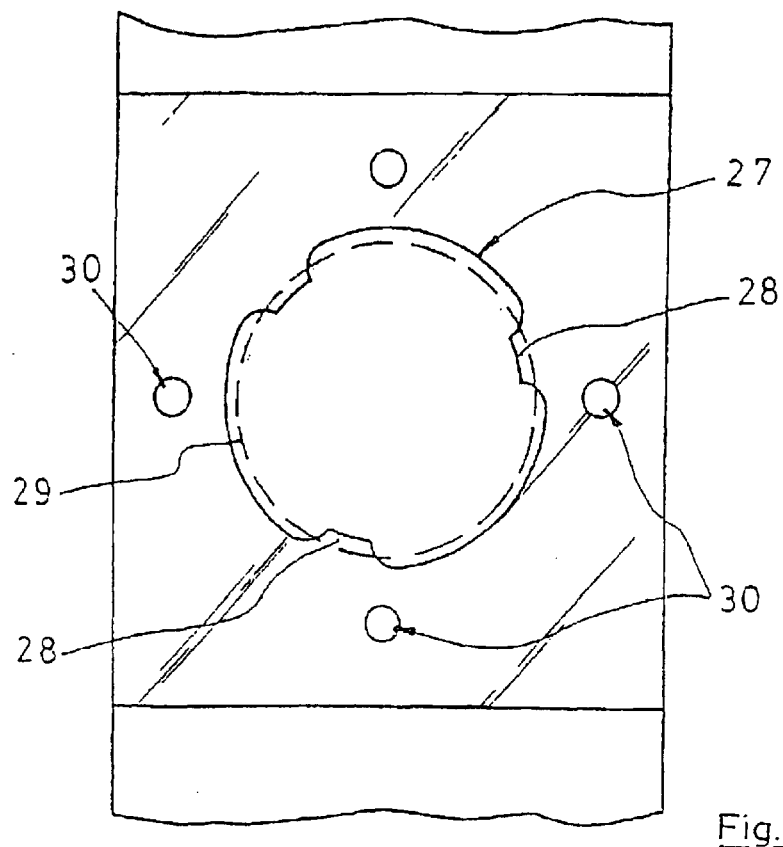
FIG. 6 shows a front view of the window defined in any one of the bent parts, being able to observe therein the lugs used to support the mirror whose outline has been illustrated with a broken line.
Figure 7:
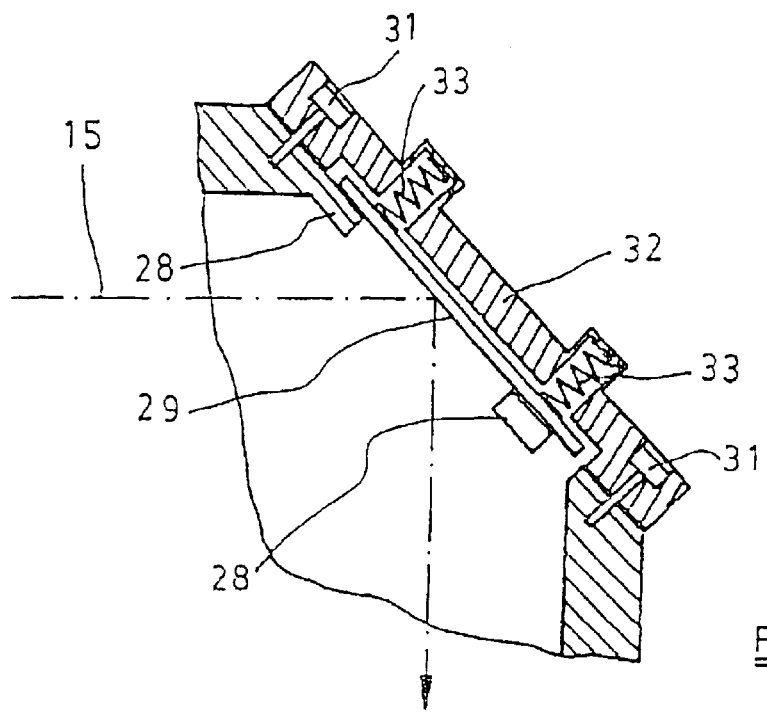
FIG. 7 shows a profile view of one of the parts used to secure the mirror on the support lugs of one of the bent parts, the latter being partially illustrated and sectioned.

To achieve this, these parts have a window (27) in each of their bends, as shown in FIGS. 6 and 7, equipped with some lugs (28) to support a mirror (29) responsible for reflecting the beam (15) with the subsequent change in direction of the beam.

The outer surface of the lugs (28), which the mirror (29) is supported on, will define a plane that forms a 45° angle exactly with the direction of incidence of the beam of the laser (15) ensuring a 90° change in direction of the same.

To achieve this, the outer surface of the lugs (28) can be reduced as necessary during the assembly and verification phase of the optical arm.

This peculiarity permits the rapid replacement of the mirror (2) in the case of deterioration with having to adjust the new mirror.

To immobilise the mirror (29) in the position of use, illustrated in FIGS. 6 and 7, the bent parts have some holes (30) on the outer surface, which a part (32) is mounted on, using some screws (31). This part has some springs (33), which are responsible for pressing the mirror (29) against the support lugs (28).

The aim of these springs is to prevent the part (32) from being able to exercise excessive pressure on the mirror (29) on establishing the grip of the setscrews (31) of said part.

Once the nature of the invention has been sufficiently described, as well as an example of preferential execution, for the appropriate purpose, it is noted that the materials, shape, size and placement of the elements described can be modified, providing this does not represent any alteration of the essential characteristics of the invention that are claimed below.

What is claimed is:

1. An optical arm for coupling to a robot and adapted to movement of the robot so as to ensure the guidance of a laser beam from a laser beam generator to an outlet part, comprising:

a first bent tubular part coupled to an outlet of the laser beam generator for rotational movement thereon and coupled to a third arm of the robot;

a second bent tubular part coupled to a first support for rotational movement thereon and coupled to a fourth arm of the robot;

a plurality of guides, the guides coupling the first bent tubular part and the second bent tubular part for relative movement of each of the first bent tubular part and the second bent tubular part, and the guides positioning an outlet of the first bent tubular part and an inlet of the second bent tubular part in opposing relationship during rotation of the fourth arm of the robot;

an extendable tubular element coupling the outlet of the first bent tubular part and the inlet of the second bent tubular part and delimiting the passage area of the laser beam;

a third bent tubular part coupled to the second bent tubular part, whereby an inlet of the third bent tubular part is positioned opposite an outlet of the second bent tubular part and an outlet of the third bent tubular part is positioned coaxially with a fifth rotation axis of the robot;

a fourth bent tubular part having three bends coupled to the third bent tubular part, whereby an inlet of the fourth bent tubular part is positioned coaxially with an outlet of the third bent tubular part for rotational movement of the fourth bent tubular part and an outlet of the fourth bent tubular part positioned parallel to a sixth rotation axis of the robot;

a second support for coupling the fourth bent tubular part with a fifth arm of the robot, whereby the fourth bent tubular part is positioned for rotation about the outlet of the third bent tubular part;

a straight tubular length coupled to the fourth bent tubular part and positioned coaxially with the outlet of the fourth bent tubular part;

a third support coupled to the fourth bent tubular length, whereby the fourth bent tubular length is maintained in a non-rotational relationship with respect to the fifth arm of the robot;

the outlet part coupled coaxially to the tubular length for rotational movement; and a transmission, the transmission transmitting the rotational movement of the sixth arm of the robot to the outlet part.

2. The optical arm according to claim 1, whereby each of the first bent tubular part, the second bent tubular part, the third bent tubular part and the fourth bent tubular part include bends that each define a 90° angle.

3. The optical arm according to claim 1, whereby each of the first bent tubular part, the second bent tubular part, the third bent tubular part and the fourth bent tubular part include at each bend a window having a plurality of inner Jugs that define an inclined plane, whereby the inclined plane supports a mirror that effects a 90° change in direction of a beam of light that impinges upon the mirror.

4. The optical arm according to claim 3, whereby each of the first bent tubular part, the second bent tubular part, the third bent tubular part and the fourth bent tubular part include a plurality of securing elements located at an exterior portion, the securing elements securing an exterior bracket having a plurality of springs, the springs pressing the mirror against the plurality of lugs.

5. The optical arm according to claim 1, whereby the first support and the second support each include elastic material that absorbs possible disalignment of the optical arm with respect to the robot during movement of the optical arm.

6. The optical arm according to claim 1, whereby the plurality of guides are coupled to one of the first bent tubular part and the second bent tubular part and positioned for movement with respect to the other of the first bent tubular part and the second bent tubular part.

7. The optical arm according to claim 1, whereby the transmission is comprised of a first pinion and a second pinion each having the same diameter and geared one to the other, the first pinion coupled coaxially to the outlet part and the second pinion coupled coaxially to the sixth arm of the robot.

* * * * *